(12) United States Patent
Skärby et al.

(10) Patent No.: US 8,706,165 B2
(45) Date of Patent: Apr. 22, 2014

(54) METHOD AND APPARATUS FOR REDUCING COMBINER LOSS IN A MULTI-SECTOR, OMNI-BASE STATION

(75) Inventors: Ulf Skärby, Lidingö (SE); Donald Staudte, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 456 days.

(21) Appl. No.: 11/607,082

(22) Filed: Dec. 1, 2006

(65) Prior Publication Data
US 2007/0173288 A1    Jul. 26, 2007

Related U.S. Application Data

(60) Provisional application No. 60/761,782, filed on Jan. 25, 2006.

(51) Int. Cl.
*H04M 1/00* (2006.01)

(52) U.S. Cl.
USPC .............. 455/562.1; 455/272; 455/279.1; 455/561; 343/751

(58) Field of Classification Search
USPC ........... 455/562.1, 561, 272–279.1; 343/751
See application file for complete search history.

(56) References Cited

U.S. PATENT DOCUMENTS 5,021,801 A * 6/1991 Smith et al. ............. 343/876
5,548,813 A * 8/1996 Charas et al. ........... 455/562.1
5,742,583 A    4/1998 Scott
5,852,651 A * 12/1998 Fischer et al. ........... 379/56.2
5,861,844 A *  1/1999 Gilmore et al. ........... 342/374

(Continued)

FOREIGN PATENT DOCUMENTS

EP    041872    3/1991
EP    652644    5/1995

(Continued)

OTHER PUBLICATIONS

Written Opinion of the International Preliminary Examining Authority for International Application No. PCT/SE2006/050533 dated May 11, 2007.

(Continued)

*Primary Examiner* — Temesghen Ghebretinsae
*Assistant Examiner* — David Bilodeau

(57) ABSTRACT

An omni-radio base station with multiple sector antenna units uses frequency division of sector signals to achieve increased coverage or capacity at reduced cost. Each sector antenna unit has an antenna for receiving a carrier signal associated with an antenna frequency in an available frequency band. At least one of the antenna units has an associated frequency converter that converts the carrier signal received by that antenna unit from the antenna frequency to a different respective frequency. Even though each sector receives the same carrier signal, an output carrier signal associated with each sector is at a different frequency band. A combiner combines the antenna unit carrier signals at different frequencies to create a composite signal for communication to the omni-radio base station. Because the antenna unit signals combined are at different frequencies, they do not interfere as much as they would if they were at the same antenna frequency, which results in less signal loss and degradation in the combiner. The carrier signals are then restored in the base station transceiver from the different respective frequencies to intermediate frequency for further processing.

40 Claims, 11 Drawing Sheets

(56) References Cited

U.S. PATENT DOCUMENTS

| | | | |
|---|---|---|---|
| 6,118,984 | A | 9/2000 | Yu-Hong |
| 6,363,262 | B1* | 3/2002 | McNicol .................. 455/561 |
| 6,377,613 | B1 | 4/2002 | Kawabe et al. |
| 6,411,825 | B1* | 6/2002 | Csapo et al. .................. 455/561 |
| 2003/0194985 | A1 | 10/2003 | Nakamura |
| 2004/0213195 | A1 | 10/2004 | Islam et al. |
| 2005/0215288 | A1* | 9/2005 | Beaudin et al. ............ 455/562.1 |
| 2007/0142057 | A1 | 6/2007 | Murakami et al. |
| 2007/0191064 | A1* | 8/2007 | Skarby et al. .............. 455/562.1 |
| 2008/0287163 | A1 | 11/2008 | Skärby et al. |
| 2008/0293451 | A1 | 11/2008 | Haskell et al. |
| 2009/0058556 | A1 | 3/2009 | Niiranen et al. |
| 2009/0280866 | A1 | 11/2009 | Lo et al. |
| 2010/0151908 | A1 | 6/2010 | Skärby et al. |

FOREIGN PATENT DOCUMENTS

| | | |
|---|---|---|
| EP | 1317079 | 6/2003 |
| JP | H02-260925 A | 10/1990 |
| JP | 2003-017927 A | 1/2003 |
| WO | WO 9617487 | 6/1996 |
| WO | WO 99/26317 | 4/1999 |
| WO | WO 99/26317 | 5/1999 |
| WO | WO 0056094 | 9/2000 |
| WO | WO 2005/088764 | 9/2005 |
| WO | WO 2005/125045 | 12/2005 |

OTHER PUBLICATIONS

U.S. Appl. No. 11/798,921, filed May 17, 2007; Inventors: Skarby et al.
International Search Report and Written Opinion mailed Jul. 22, 2008 in corresponding PCT Application PCT/SE2007/050518.
Office Action mailed Mar. 4, 2010 in co-pending U.S. Appl. No. 11/798,921.
International Preliminary Report on Patentability mailed Nov. 26, 2009 in corresponding PCT Application PCT/SE2007/050518.
U.S. Appl. No. 12/656,850, filed Feb. 18, 2010; Inventors: Skärby et al.
Office Action issued Dec. 16, 2009 in U.S. Appl. No. 11/798,921.
Office Action issued Sep. 14, 2010 in U.S. Appl. No. 11/798,921.
Office Action issued Feb. 24, 2011 in U.S. Appl. No. 11/798,921.
Pre-Brief Conference Decision issued Aug. 8, 2011 in U.S. Appl. No. 11/798,921.
Examiner's Answer to Appeal Brief issued Nov. 23, 2011 in U.S. Appl. No. 11/798,921.
Office action issued Mar. 1, 2012 in U.S. Appl. No. 12/656,850.
Office Action issued Oct. 16, 2012 in U.S. Appl. No. 12/656,850.

* cited by examiner

Omni-Base Station with Diversity

3-Sector Base Station

METHOD AND APPARATUS FOR REDUCING COMBINER LOSS IN A MULTI-SECTOR, OMNI-BASE STATION

RELATED APPLICATION

This application claims the priority and benefit of U.S. Provisional patent application 60/761,782, filed Jan. 25, 2006, which is incorporated herein by reference in its entirety.

TECHNICAL FIELD

The technical field relates to multi-sector radio base stations. In one non-limiting example application, the technology described here may be used in an omni base station that is coupled to a multi-sector antenna system.

BACKGROUND

An omni-base station is a base station that is configured to use an omni-antenna, and a sector base station is configured to use multiple (two or more) sector antennas. FIG. 1A shows a single cell area for a base station (BS) with an omni-antenna. An omni-antenna radiates 360 degrees to provide coverage over the entire cell area. FIG. 1B shows single cell area for a base station (BS) with three sector antennas. A three sector base station is a common sector configuration, but more or less sectors could be used. In this case, the cell area is divided into thirds, with each sector antenna having a narrower beam (as compared to an omni-antenna) that radiates to provide coverage over its sector area of approximately 120 degrees.

A base station antenna is often mounted in an elevated location, such as on a tower, a pole, on the top or sides of buildings, etc., to enhance coverage and provide better possibilities for direct radio signal propagation paths. FIG. 2A shows a base station unit 14 located at the base of a tower 12. An antenna 10 is mounted on the top of the tower 12 and is coupled via a feeder cable 16, typically a coaxial cable or the like, to the base station transceiver. The received signal suffers signal losses traversing the feeder 16, and the taller the tower 12, the longer the feeder, and the greater the loss. In order to offset such signal losses in the feeder, a tower-mounted amplifier (TMA) may be used to amplify the received signal before it is sent over the feeder to the base station unit. FIG. 2B shows a TMA 18 mounted at the top of the tower 12 near antenna 10. A tower mounted unit is sometimes called a mast head amplifier. The term tower mounted amplifier (TMA) is used generically herein to include any device that performs this pre-feeder amplification function.

FIG. 3 shows a simplified block diagram of an omni-base station 20. The antenna 10 is coupled to a duplex filter 21 in the TMA 18 which includes a receive (Rx) filter 22 and a transmit (Tx) filter 24. The duplex filter makes it possible to send and receive on the same antenna by separating the Tx and Rx signals from each other. The transmit filter 24 is coupled directly to the feeder 16, and the receive filter 22 is coupled to the feeder 16 via a low noise amplifier (LNA) 26. The feeder 16 couples to the base station 14 which also includes a duplex filter 28 having a receive filter (Rx) 30 and a transmit (Tx) filter 32. The transmit filter 32 is coupled to the transceiver 36, and the receive filter 30 is coupled to the transceiver 36 via a low noise amplifier 34.

Antenna diversity may be used in order to improve reception (or transmission) of transmitted radio signals. There are many kinds of diversity, such as time diversity, space diversity, and combinations thereof. A promising diversity scheme uses time/space coded signals and is referred to as Multiple Input Multiple Output diversity (MIMO). Space diversity reduces the effects of fading received radio signals. An antenna diversity systems comprises at least two antennas arranged at a distance from each other. In the case of receive diversity, the received signal is received on the two or more antennas. The Rx signals from the diversity antennas are subjected to diversity processing in order to obtain an enhanced signal. Diversity processing may, for example, include selecting the antenna signal which is strongest, or adding the signals and further processing the resulting signal. In transmitter diversity, the transmit TX signal is transmitted on the two or more transmit antennas to which the transmitter is connected. Antennas of a diversity arrangement are called diversity antennas. In diversity arrangements, a feeder and its associated antenna may be referred to as a diversity branch or simply branch.

FIG. 4 shows an example of an omni-base station 14 with diversity. Two diversity antennas 10a and 10b are coupled to corresponding TMAs 18a and 18b. Each TMA is coupled by a corresponding feeder 16a and 16b to a corresponding duplex filter and low noise amplifier unit 42a and 42b in the base station 14. The two duplex filter and LNA units 42a and 42b are coupled to a single transceiver 36.

In contrast to the single transceiver used in the omni-base station, a sector base station such as that shown at 50 in FIG. 5 has a separate transceiver for each sector. Three sectors are supported with each sector having its own antenna $10_1$, $10_2$, and $10_3$. Each of the antennas $10_1$, $10_2$, and $10_3$ is coupled to a corresponding sector TMA $18_1$, $18_2$, and $18_3$. Three feeders $16_1$, $16_2$, and $16_3$ couple respective TMAs $18_1$, $18_2$, and $18_3$ to corresponding base station units $14_1$, $14_2$, and $14_3$. Each of the base station units $14_1$, $14_2$, and $14_3$ has a corresponding duplex filter and low noise amplifier unit $42_1$, $42_2$, and $42_3$. A sector base station provides more coverage than an omni-base station but at higher monetary and power costs.

Although omni-base stations are less complex and less expensive than sector base stations, they also provide less coverage, and therefore, an operator must install more omni-base stations to cover a particular geographic area than if sector base stations were installed. In response, multi-sector omni-base stations were introduced where an omni-base station is coupled to a multi-sector antenna system. In fact, in an example where a three sector antenna system is used with an omni-base station, the three sector antenna system adds approximately 7-8 dB of signal gain. Another benefit of a multi-sector omni-base station is the ability to "tilt", e.g., downtilt, one or more of the sector antennas. Tilting is not an option for omni antennas.

An example of a three sector base station 60 is shown in FIG. 6A. Three sectors are supported with each sector having its own antenna $10_1$, $10_2$, and $10_3$. Each of the antennas $10_1$, $10_2$, and $10_3$ is coupled to a corresponding sector TMA $18_1$, $18_2$, and $18_3$. Three feeders $16_1$, $16_2$, and $16_3$ couple respective TMAs $18_1$, $18_2$, and $18_3$ to the base station 14. The base station 14 includes three duplex filter and low noise amplifier units labeled generally at 42 coupled to three transceivers 36. But because feeder cables, duplex filters, and transceivers are expensive, (even more so when diversity is used in each sector), a splitter/combiner is used so that only one feeder is necessary. FIG. 6B shows how the received signals from the three sectors 1, 2, and 3 are combined together in a splitter/combiner 44 onto one feeder cable 16. In the transmit direction, the transmit signal is split into three identical signals (at lower power) and provided to each sector's TMA.

But the feeder cost savings attained by using a splitter/combiner is offset by the substantial power lost in the combiner. Indeed, in the three sector example mentioned above, the 7-8 dB gain achieved by using a three sector antenna system is offset by 5 dB lost in the combiner. That loss is attributable to the interference between the three sector receive signals caused when they are combined in the combiner. That frequency overlap interference significantly reduces the signal-to-noise ratio of the sector signals received in the base station transceiver. The power is split to three different sectors in the splitter for the downlink transmission at 5 dB (i.e., one third) less power for each sector. One approach available to deal with the downlink transmission loss is to simply increase the base station transmit power. But substantially increasing the mobile station transmission power levels across the board is not an option in the uplink because transmit power of mobile stations generally must be tightly controlled and limited.

SUMMARY

An omni-radio base station with multiple sector antenna units uses frequency division of sector signals to achieve increased coverage or capacity at reduced cost. Each sector antenna unit is coupled to an antenna for receiving a carrier signal associated with an antenna frequency in an available frequency band. The term "frequency band" includes a single frequency as well as a range of frequencies. A frequency converter in the antenna unit converts the carrier signal received by one of the multiple antenna units from that antenna frequency to a different respective frequency. A narrowband filter filters out a part of the available frequency band of interest. More than one frequency converter may be employed. A combiner combines carrier signals associated with each multiple antenna units to create a composite signal for communication to the omni-radio base station. At least two of the carrier signals associated with the multiple antenna units and combined in the combiner are received by receiving circuitry in the omni-base station at a different frequency.

Depending on the implementation, the number of multiple sector antenna units having a corresponding frequency converter may be less than the number of multiple sector antenna units or the same. The combiner may combine carrier signals associated with each of the multiple antenna units to create a composite signal in which all of the carrier signals combined are associated with a different frequency band or in which only some of the carrier signals to be combined are at a different frequency.

In one non-limiting example embodiment, each frequency converter includes a first local oscillator (LO) for providing a first LO frequency signal, and a first mixer frequency converts one of the sector carrier signals using the first LO frequency signal into an intermediate frequency (IF) signal. A narrowband filter filters the frequency converted output. A second local oscillator provides a second LO frequency signal corresponding to the respective frequency band, and a second mixer mixes the second LO frequency signal and the intermediate frequency signal to generate a frequency converted output. A narrowband filter or broadband filter (depending on the selectivity in the IF filter) filters the frequency converted output to the respective frequency band. Alternatively, the IF conversion need not be performed if there is a narrowband filer with enough selectivity after the conversion.

A feeder coupled to the combiner transports the composite signal to a base station unit. Omni-base station receiving circuitry extracts each carrier signal corresponding to the multiple sector antenna units from the composite signal. The omni-base station receiving circuitry includes one or more base station mixers. Each base station mixer frequency converts a corresponding one of the respective carrier signals associated with a different frequency to an intermediate frequency for further processing. In a non-limiting three sector example, at least two base station mixers each receives a different local oscillator signal for extracting a different sector carrier signal.

In one example implementation, one or more frequency converters is included in a corresponding one or more of the multiple antenna units. In another, the one or more frequency converters are included in the combiner. If there are multiple respective different frequency bands used as a result of the frequency conversion, those respective different frequency bands are distributed over the available frequency band. Preferably, those respective frequency bands are evenly distributed over the available frequency band.

Diversity reception may be employed. For example, each sector may include a first diversity antenna unit and a second diversity antenna unit. One non-limiting example diversity implementation includes a first combiner for combining carrier signals associated with each of the first diversity antenna units to create a first composite signal for communication to the omni-radio base station, and a second combiner for combining carrier signals associated with each of the second diversity antenna units to create a second composite signal for communication to the omni-radio base station. A first feeder transports the first composite signal to the base station unit, and a second feeder transports the second composite signal to the base station unit. The base station unit extracts each of the diversity carrier signals corresponding to the multiple sector antenna units from the first and second diversity composite signals using one or more base station mixers. Each base station mixer frequency converts a corresponding one of the respective diversity carrier signals associated with a different frequency to an intermediate frequency for further processing.

In another non-limiting example diversity implementation, a single combiner is used to combine carrier signals associated with each of the first and second diversity antenna units to create the composite signal for communication to the omni-radio base station. A splitter/combiner combines the sectors to one feeder cable. The single feeder then transports the composite signal including two frequencies for each sector to the base station receiver circuitry, which extracts each diversity carrier signal corresponding to the multiple diversity sector antenna units from the composite signal using one or more base station mixers. Each base station mixer frequency converts a corresponding one of the respective diversity carrier signals associated with a different frequency to an intermediate frequency for further processing.

Frequency converting the signals received on at least one or more sector antenna units used with an omni-radio base station permits combiner loss normally encountered when sector signals are combined without frequency conversion. If all the signals in a three sector omni-radio base station combined are at different frequencies, then approximately a 5 dB power loss is avoided in the combiner. That way fewer feeder cables can be used without incurring a substantial loss in the combiner. Indeed, only a single feeder cable need be used in non-diversity as well as in diversity implementations. More efficient multi-sector omni-base stations are commercially attractive because coverage and/or capacity for omni-base stations can be increased using sector antennas. Indeed, existing omni-base stations can be easily upgraded to full coverage base stations using sector receive antennas and frequency conversion before combining and transmission to the base station transceiver over a feeder cable. Another advantage is that the power consumption is lower because less hardware is used.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. For example, while example embodiments are described in the context of multi-sector omni-radio base stations, the disclosed technology may also be applied to other types of multi-antenna devices and to indoor as well as outdoor applications. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1A:
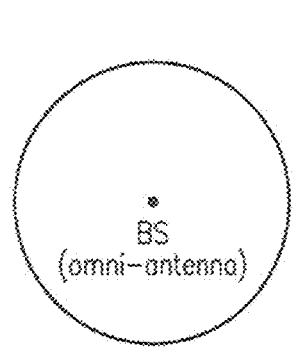
FIG. 1A shows single cell area for a base station (BS) with an omni-antenna.
Figure 1B:
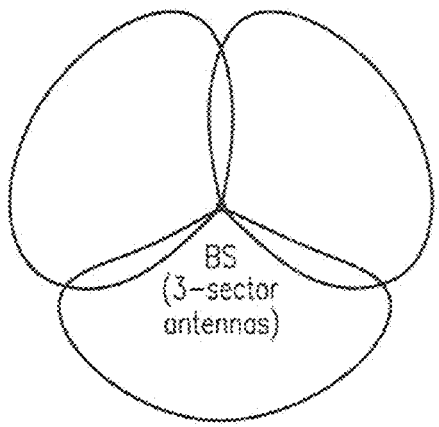
FIG. 1B shows single cell area for a base station (BS) with three sector antennas.
Figure 2A:
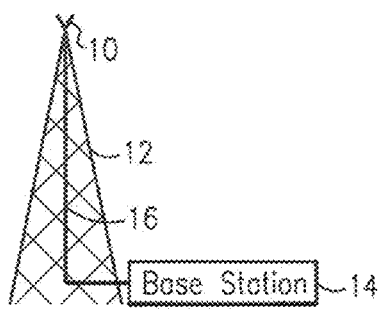
FIG. 2A shows a base station tower.
Figure 2B:
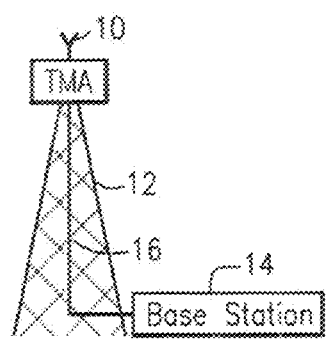
FIG. 2B shows a base station tower with tower-mounted amplifier (TMA)
Figure 3:
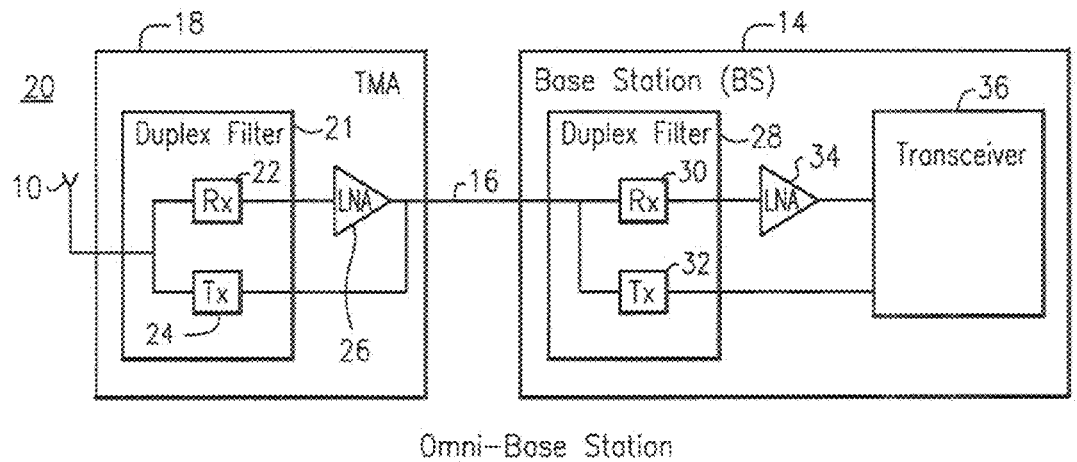
FIG. 3 shows a simplified block diagram of an omni-base station.
Figure 4:
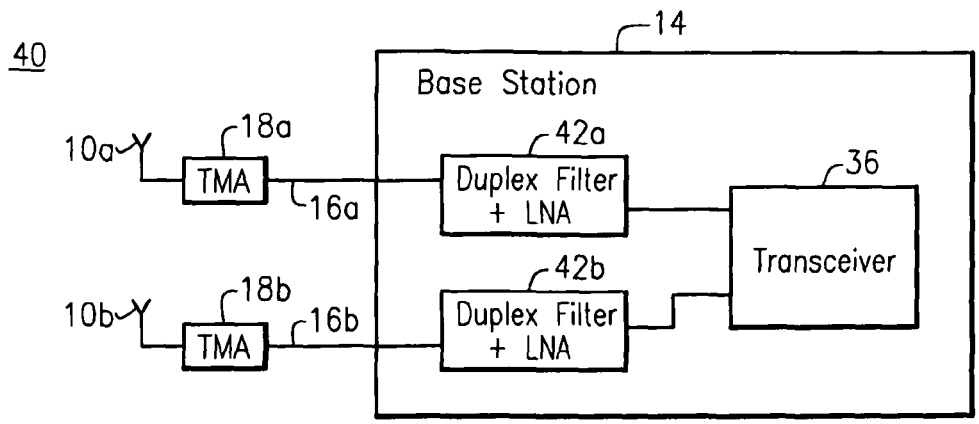
FIG. 4 shows an example of an omni-base station with diversity.
Figure 5:
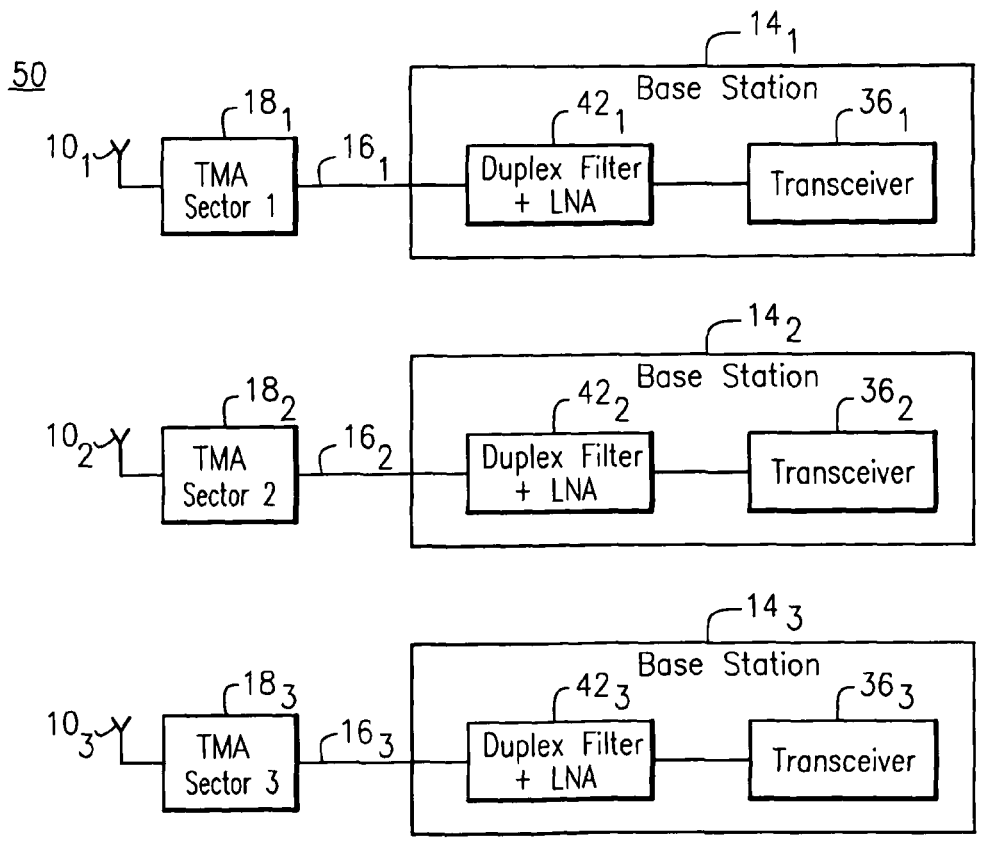
FIG. 5 shows an example of a sector base station.
Figure 6A:
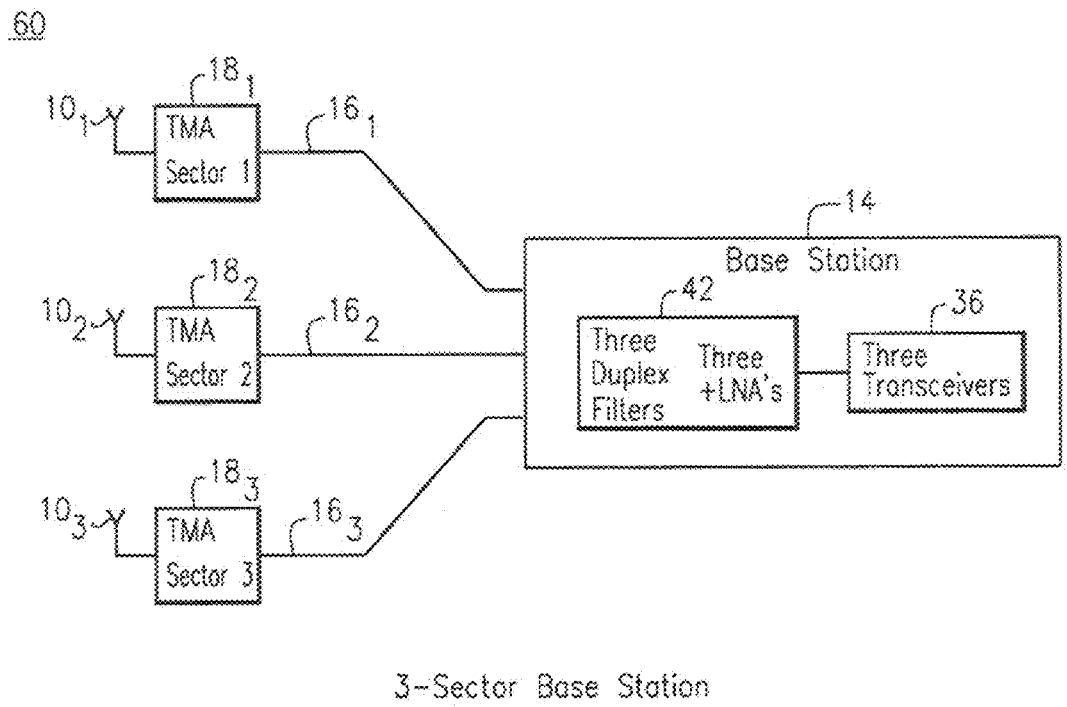
FIG. 6A shows an example of a three sector base station.
Figure 6B:
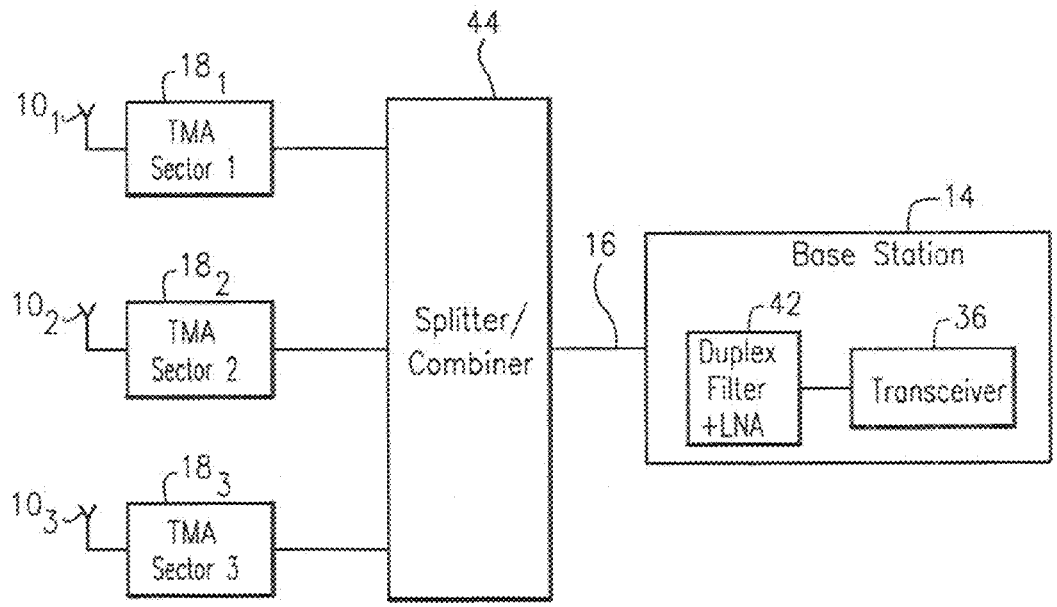
FIG. 6B shows an example of a three sector omni-base station using a splitter/combiner and one feeder cable.
Figure 7:
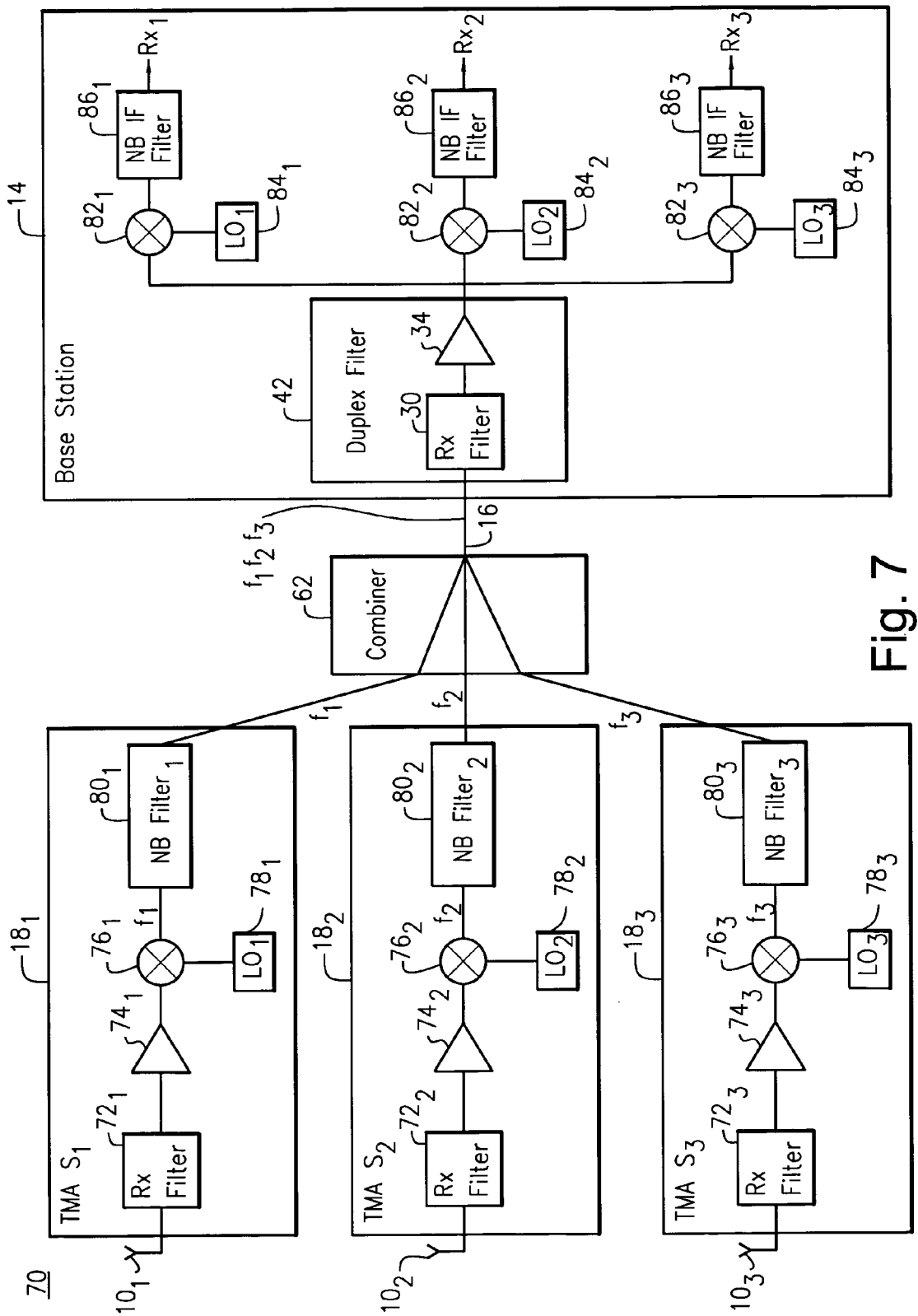
FIG. 7 is a function block diagram of a non-limiting example embodiment of a multi-sector, omni-base station with reduced combiner loss.

FIG. 7 is a function block diagram of a non-limiting example embodiment of a multi-sector, omni-base station 70 with reduced combiner loss. Although the term "multiple" is understood to mean two or more, in this non-limiting example, three sectors $S_1$, $S_2$, and $S_3$ are supported, with each sector having its own antenna $10_1$, $10_2$, and $10_3$. Each of the antennas $10_1$, $10_2$, and $10_3$ is coupled to a corresponding sector antenna unit referred to in a non-limiting way as a tower mounted amplifier (TMA) $18_1$, $18_2$, and $18_3$. The three TMAs $18_1$, $18_2$, and $18_3$ are connected to a splitter/combiner 62 so that only one feeder 16 is needed to couple the TMA received signals to an omni-base station 14 which includes a single duplex filter and low noise amplifier unit 42 which includes a receive filter 30 and a low noise amplifier 34. For simplicity, the transmit path has been omitted. Each TMA includes a receive (Rx) filter $72_1$, $72_2$, and $72_3$ coupled to its respective antenna $10_1$, $10_2$, and $10_3$.

Each receive filter $72_1$, $72_2$, and $72_3$ is coupled to a respective amplifier $74_1$, $74_2$, and $74_3$, and the amplified output is coupled to a corresponding mixer $76_1$, $76_2$, and $76_3$ where it is mixed with a frequency translating signal generated for example by a local oscillator $78_1$, $78_2$, and $78_3$. In one non-limiting example, the frequency translating signal is different for each sector so that each sector signal is converted to a different frequency. Each mixer's output is filtered using a respective narrowband (NB) or bandpass filter $80_1$, $80_2$, and $80_3$ centered on the respective frequency to remove other mixer products as well as noise and interference from other parts of the available band.

Although each sector signal is shown as frequency translated for the benefit of description only, one or more of the sector signals may not be frequency converted. Preferably, each sector signal is at a different frequency before being combined and transported to the omni-radio base station transceiver unit. In this three sector example, two of the sector signals could be frequency translated to different frequencies while the third sector signal is not frequency translated. In that case, the three sector signals are still at a different frequencies. The different frequencies are identified as $f_1$, $f_2$, and $f_3$. In a less optimal example implementation, some of the sector signals are at different frequencies but two or more sector signals remain at the same frequency. This implementation is less optimal because the signals at the same frequency interfere and the signal-to-noise ratio is reduced in the combiner.

Although not necessary, it may be desirable to frequency convert the combined signal to a different frequency, e.g., lower frequency, before transmitting the combined signal over the feeder 16. For example, converting the combined signal to a much lower frequency can minimize loss in the feeder 16 and thus further reduce noise.

At the base station 14, the feeder 16 connects to a duplex filter unit 42 of which only the receive filter 30 and LNA 34 are shown. The duplex filter unit 42 is connected to an omni-base station receiver, only part of which is shown and includes mixers $82_1$, $82_2$, and $82_3$. Normally, the multi-sector, omni-base station receiver would use one mixer at this stage followed by a narrowband filter to downconvert the received radio signal. But because each of the sector receive signals in this example is at a different frequency, three different local oscillator signals $LO_1$, $LO_2$, and $LO_3$ are mixed with composite signal from the combiner 62. Local oscillators $84_1$, $84_2$, and $84_3$ provide those three different local oscillator signals $LO_1$, $LO_2$, and $LO_3$. Each output is then filtered in a narrow-band intermediate frequency (IF) filter $86_1$, $86_2$, and $86_3$ to produce a corresponding sector receive signal $Rx_1$, $Rx_2$, and $Rx_3$. These sector receive signals $Rx_1$, $Rx_2$, and $Rx_3$ are then ready for further processing.

Figure 8A:
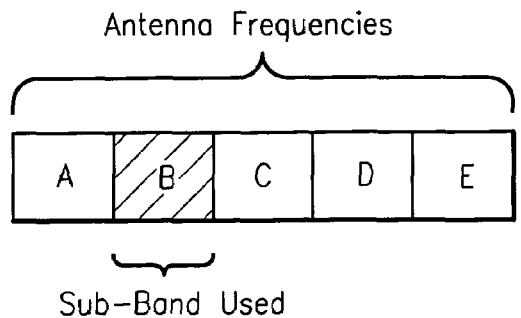
FIG. 8A is a diagram of an available frequency band divided into subbands at the antennas for, e.g., an 850 MHz band.
Figure 8B:
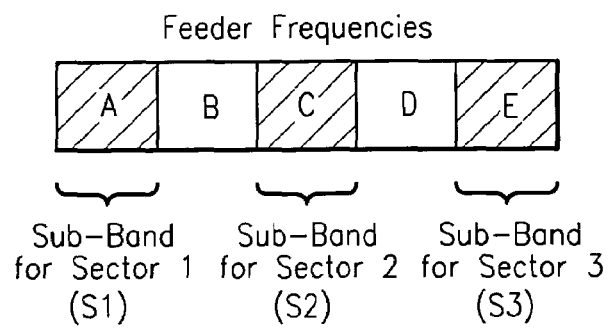
FIG. 8B is a diagram showing an example where different sector signals are frequency-translated to a corresponding subband in the available frequency band on the feeder.

To help explain the frequency translation, an example is now described in conjunction with FIGS. 8A and 8B. FIG. 8A is a diagram of an available antenna frequency band divided into subbands A-E. However, subband B is the frequency band used by the omni-radio base station. FIG. 8B is a diagram showing an example where the three different sector signals all received in the used subband B are frequency translated to a corresponding subband in the available frequency band for the feeder: subbands A, C, and E are used. Although one of the sector signals need not be frequency translated and could remain in the used subband B, in this case, it is not desirable because there would be no guardband. Having a guard band reduces the chance of interference between the sector carrier signals.

Figure 9A:
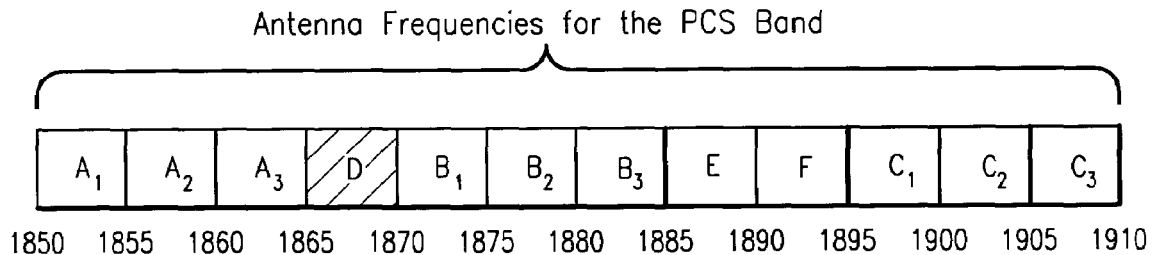
FIG. 9A is a diagram of a PCS frequency band divided into 5 MHz subbands.
Figure 9B:
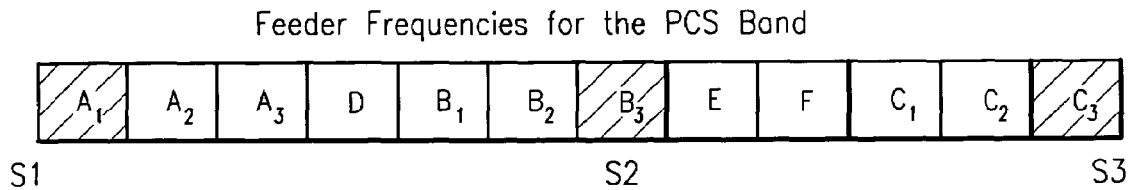
FIG. 9B is a diagram of showing an example where three different sector signals are frequency translated to a corresponding subband in the PCS frequency band on the feeder.

A real world example in the Personal Communication Services (PCS) band is now described in conjunction with FIGS. 9A and 9B. FIG. 9A is a diagram of antenna frequencies for the PCS frequency band from 1850-1910 MHz divided into twelve 5 MHz subbands $A_1$, $A_2$, $A_3$, D, $B_1$, $B_2$, $B_3$, E, F, $C_1$, $C_2$, and $C_3$. The used subband by the radio base station is the 5 MHz D band from 1865-1870 MHz. For the three sector example, the three different sector signals all received in the used subband D are frequency translated to a corresponding feeder subband frequency in the available frequency band, which in this example are $A_1$, $B_3$, and $C_3$ as shown in FIG. 9B. However, one of the sector signals need not be frequency translated and could remain in the used subband D and there would still be a guard band separating the three sector signals.

In this non-limiting example, the receive filters $72_1$, $72_2$, and $72_3$ each pass the available 60 MHz frequency band from 1860-1910 MHz. But the base station is only using the 5 MHz "D" subband from 1865-1870 MHz. The first sector received signal is frequency shifted to the $A_1$ subband using an $LO_1$ signal set at 15 MHz (1865–1850=15) and a NB $filter_1$ passing frequencies between 1850-1855 MHz. The second sector received signal is frequency shifted to the $B_3$ subband using an $LO_2$ signal set at 15 MHz (1880–1865=15) and a NB $filter_2$ passing frequencies between 1880-1885 MHz. The third sector received signal is frequency shifted to the $C_3$ subband using an $LO_3$ signal set at 40 MHz (1905–1865=40) and a NB $filter_3$ passing frequencies between 1905-1910 MHz.

The frequency multiplexed signal carrying the three sector carriers at three different frequency bands $A_1$ (1850-1855), $B_3$ (1880-1885), $C_3$ (1905-1910) over the feeder 16 is processed by the omni-base station receiving circuitry. The received signal is filtered using the receive filter 30 which passes the 60 MHz wide PCS band from 1850-1910 MHz. After amplifying the filtered signal in the LNA 34, the amplified received signal is sent to three mixers $82_1$, $82_2$, and $82_3$, one in this example for each sector where the sector signal was frequency converted before sending it over the feeder 16. The purpose of the receiving circuitry shown is to convert each sector signal to the same intermediate frequency (IF) signal. IF downconversion simplifies filtering and facilitates later baseband processing. To accomplish conversion to an IF of 200 MHz, the $LO_1$ is set to 1652.5 MHz; the $LO_2$ is set to 1682.5 MHz; and $LO_3$ is set to 1707.5 MHz. In this non-limiting example, the 200 MHz output from mixer $82_1$ is then filtered by each of the three 5 MHz NB filter $86_1$, $86_2$, and $86_3$ to pass frequencies from 197.5-202.5 MHz (centered around the 200 MHz IF).

Figure 10:
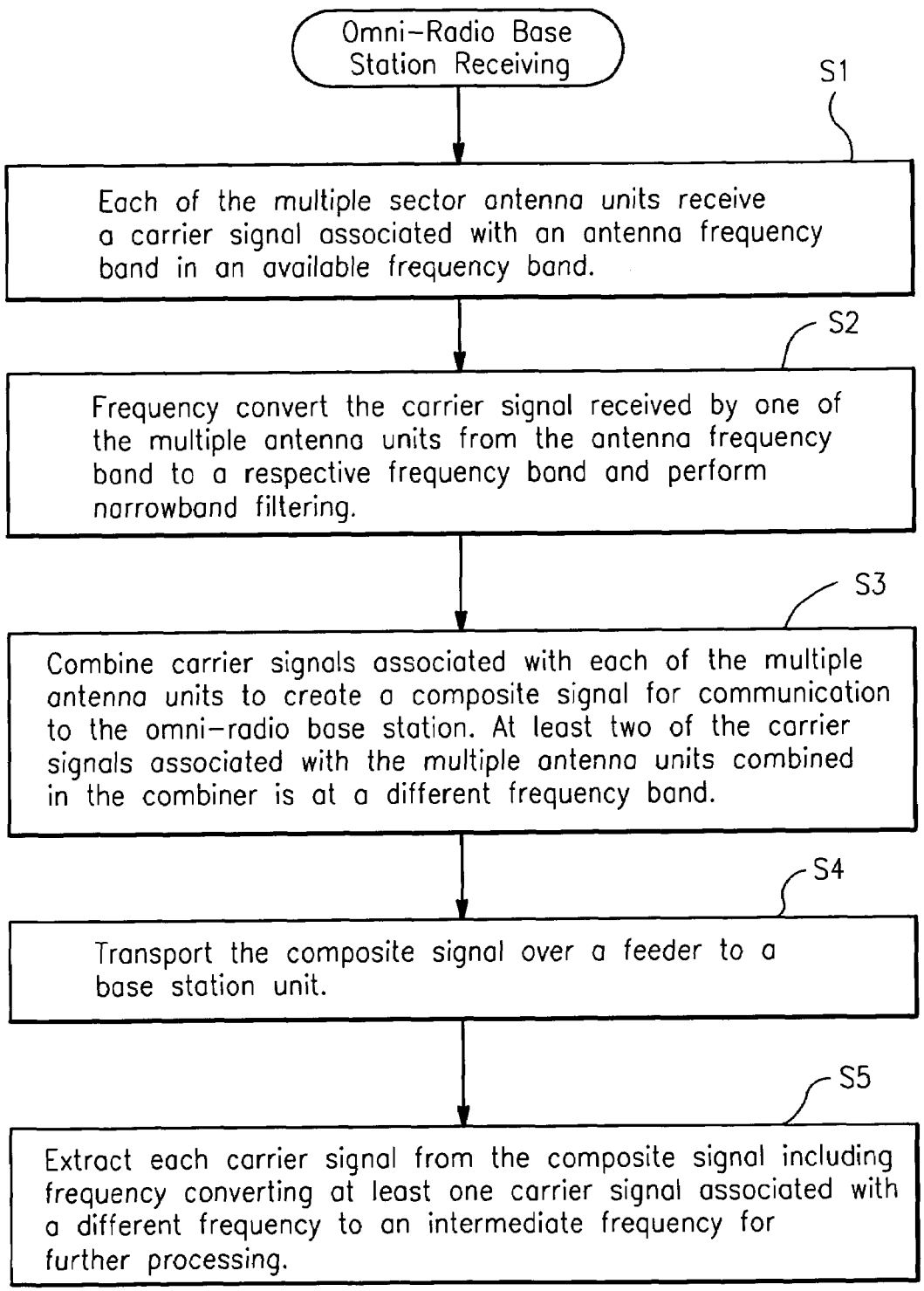
FIG. 10 is a flowchart outlining non-limiting example procedures for reducing combiner loss in a multi-sector, omni-base station.

FIG. 10 is a flowchart outlining non-limiting example procedures for reducing combiner loss in a multi-sector, omni-base station. In step S1, each of the multiple sector antenna units receives a carrier signal associated with an antenna frequency in an available frequency band. The carrier signal received by one of the multiple antenna units is frequency converted from the antenna frequency to a respective frequency different from the antenna frequency band and narrowband filtering (step S2). The carrier signals associated with each of the multiple antenna units are combined to create a composite signal for communication to the omni-radio base station (step S3). At least two of the carrier signals associated with the multiple antenna units and combined in the combiner are at a different frequency. The composite signal is transported over a feeder to a base station unit (step S4). Each carrier signal is extracted from the composite signal including frequency converting at least one carrier signal associated with a different frequency to an intermediate frequency for further processing (step S5).

Figure 11:
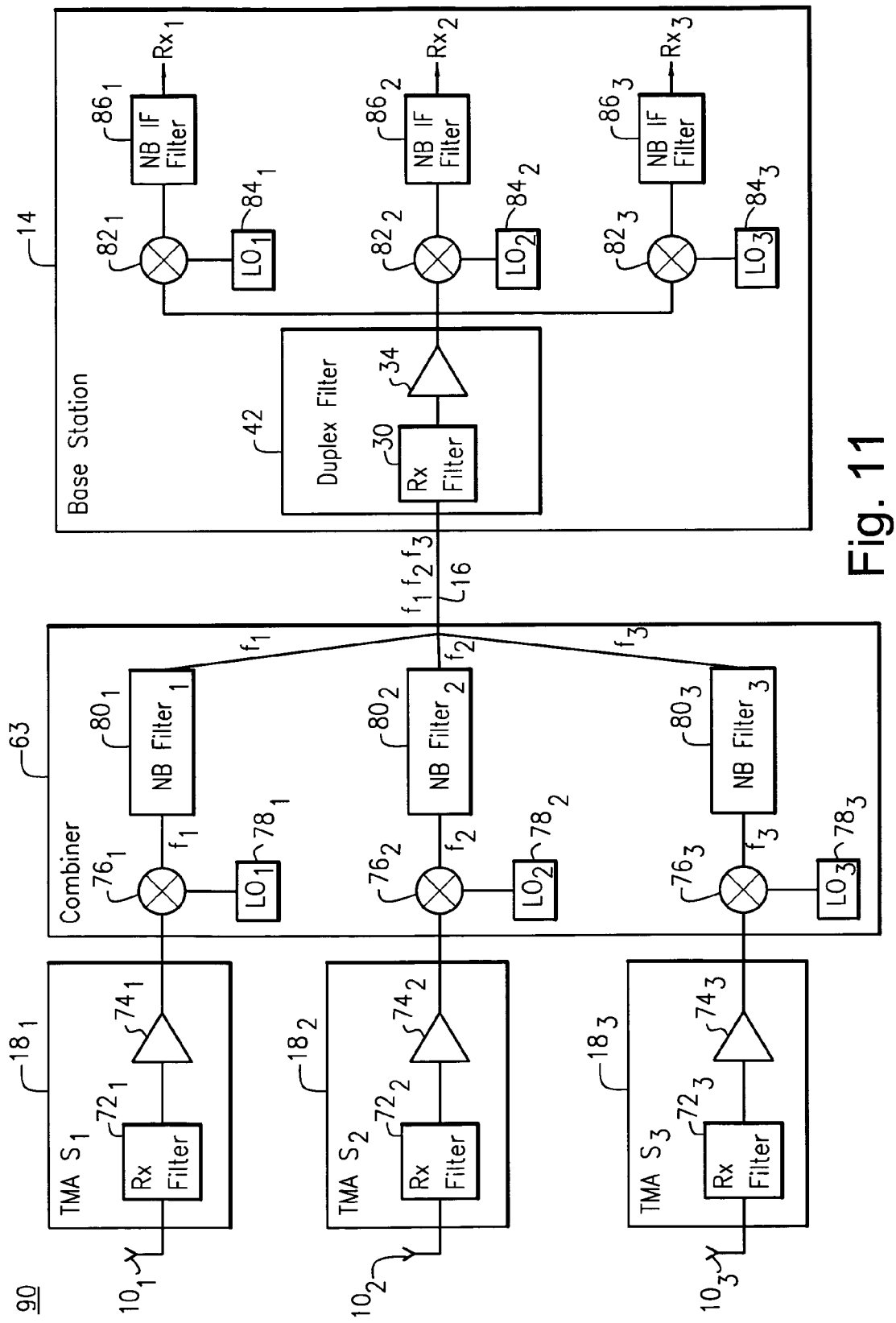
FIG. 11 is a function block diagram of another non-limiting example embodiment of a multi-sector, omni-base station with reduced combiner loss.

FIG. 11 is a function block diagram of another non-limiting example embodiment of a multi-sector, omni-base station 90 with reduced combiner loss. This embodiment is similar to that in FIG. 7 except that the frequency conversion is performed in the combiner 63 instead of the antenna units. Alternatively, three antennas could be coupled to one TMA unit that includes three receive filters, three LNAs, three frequency converters, three narrowband filters, and one combiner coupled to one feeder.

Figure 12:
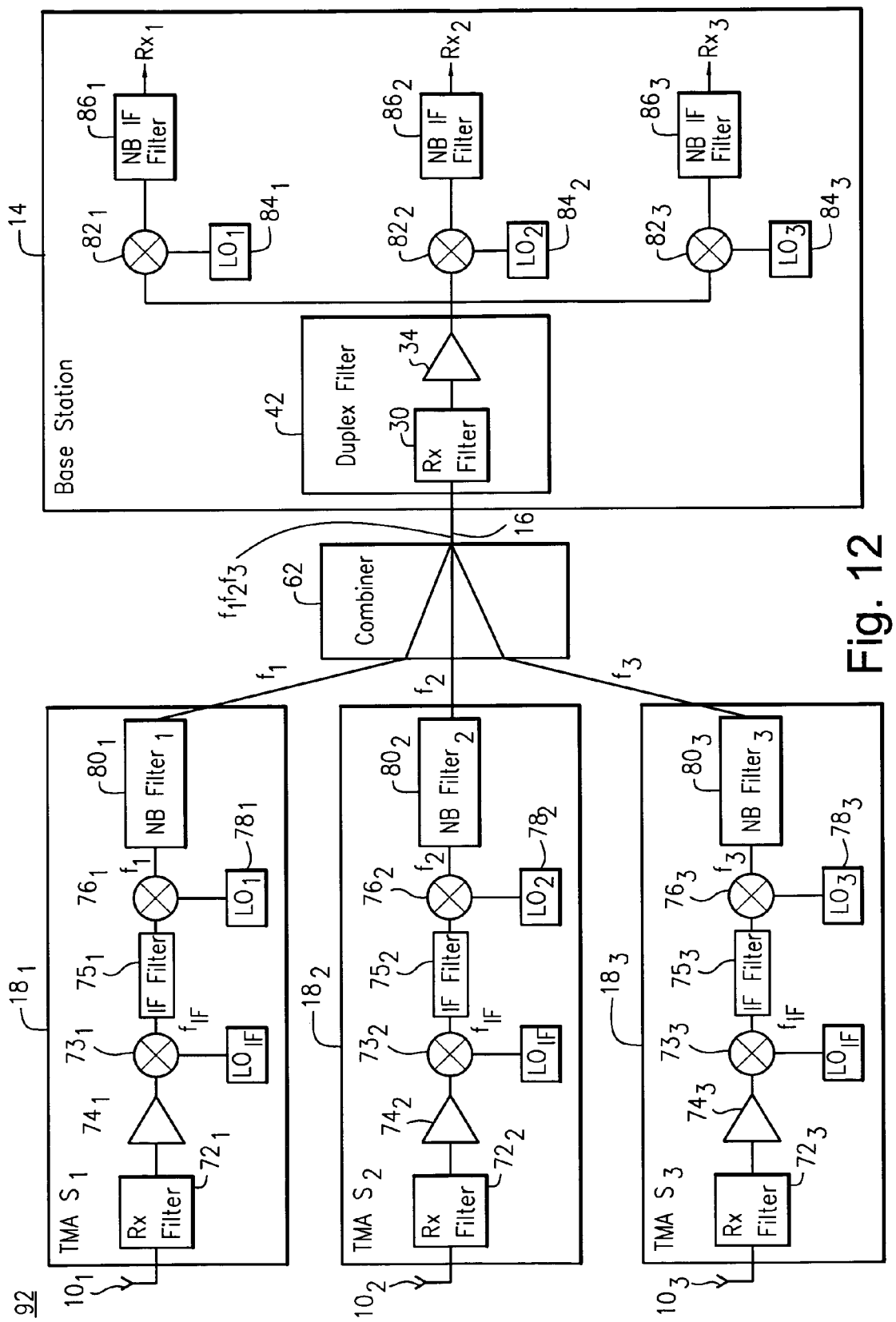
FIG. 12 is a function block diagram of another non-limiting example embodiment of a multi-sector, omni-base station with reduced combiner loss.

FIG. 12 is a function block diagram of another non-limiting example embodiment of a multi-sector, omni-base station 92 with reduced combiner loss in which the frequency conversion includes an intermediate frequency (IF) conversion, narrowband filtering, and conversion to RF in approximately the available frequency band but on a different frequency. The reasons an IF conversion may be employed first before performing the frequency conversion to separate the sector signals in frequency before combining include: (a) IF-filters are more effective than RF-filters, (b) IF down-conversion and up-conversion are better known techniques than RF-RF conversions, and (c) the feeder frequencies may be located where desired in the available frequency band. The mixers and the local oscillators in the base station down-convert the different frequencies to IF for further processing.

Figure 13A:
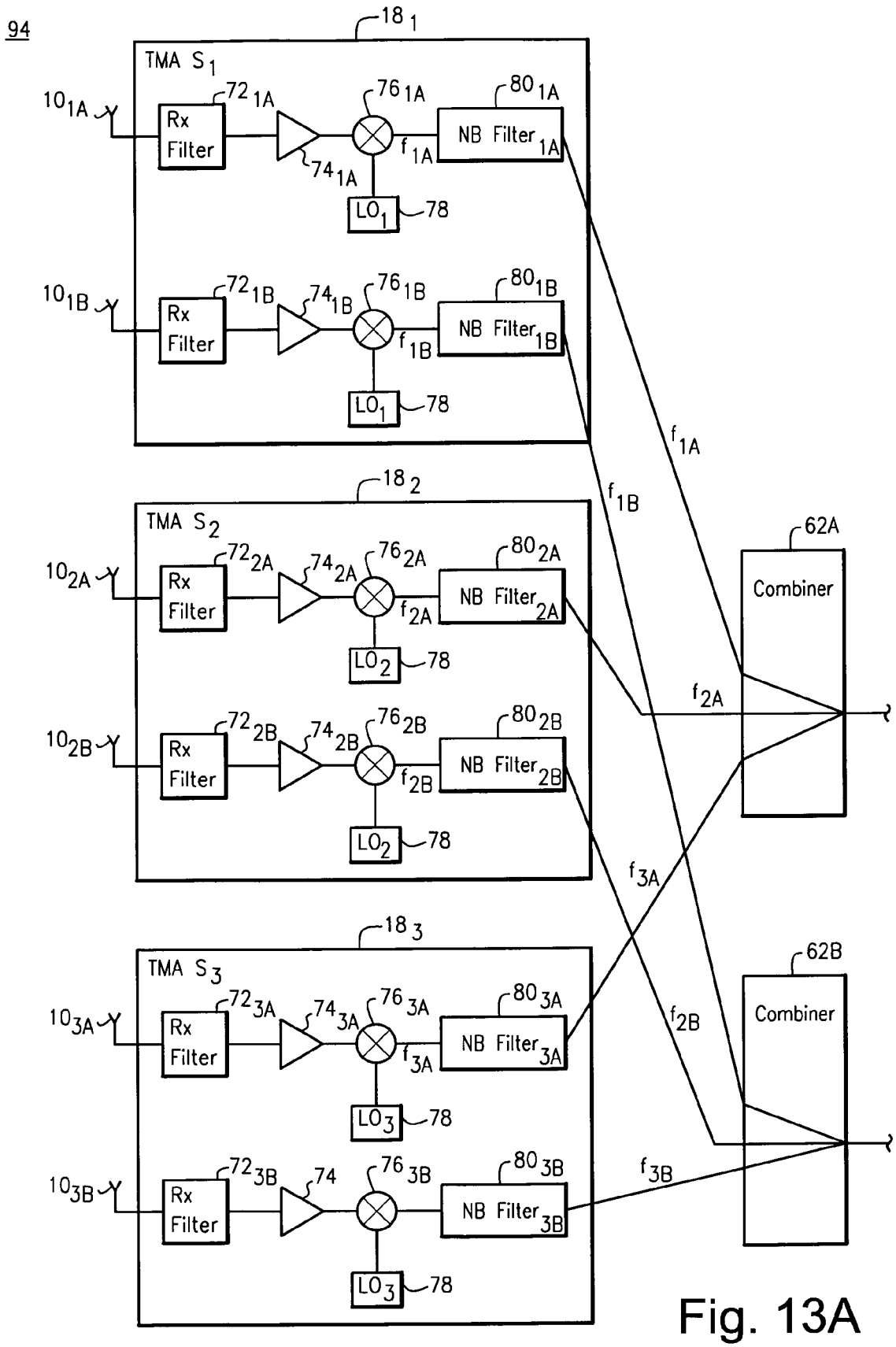
FIGS. 13A and 13B are a function block diagram of another non-limiting example embodiment of a multi-sector, omni-base station with reduced combiner loss with diversity.
Figure 13B:
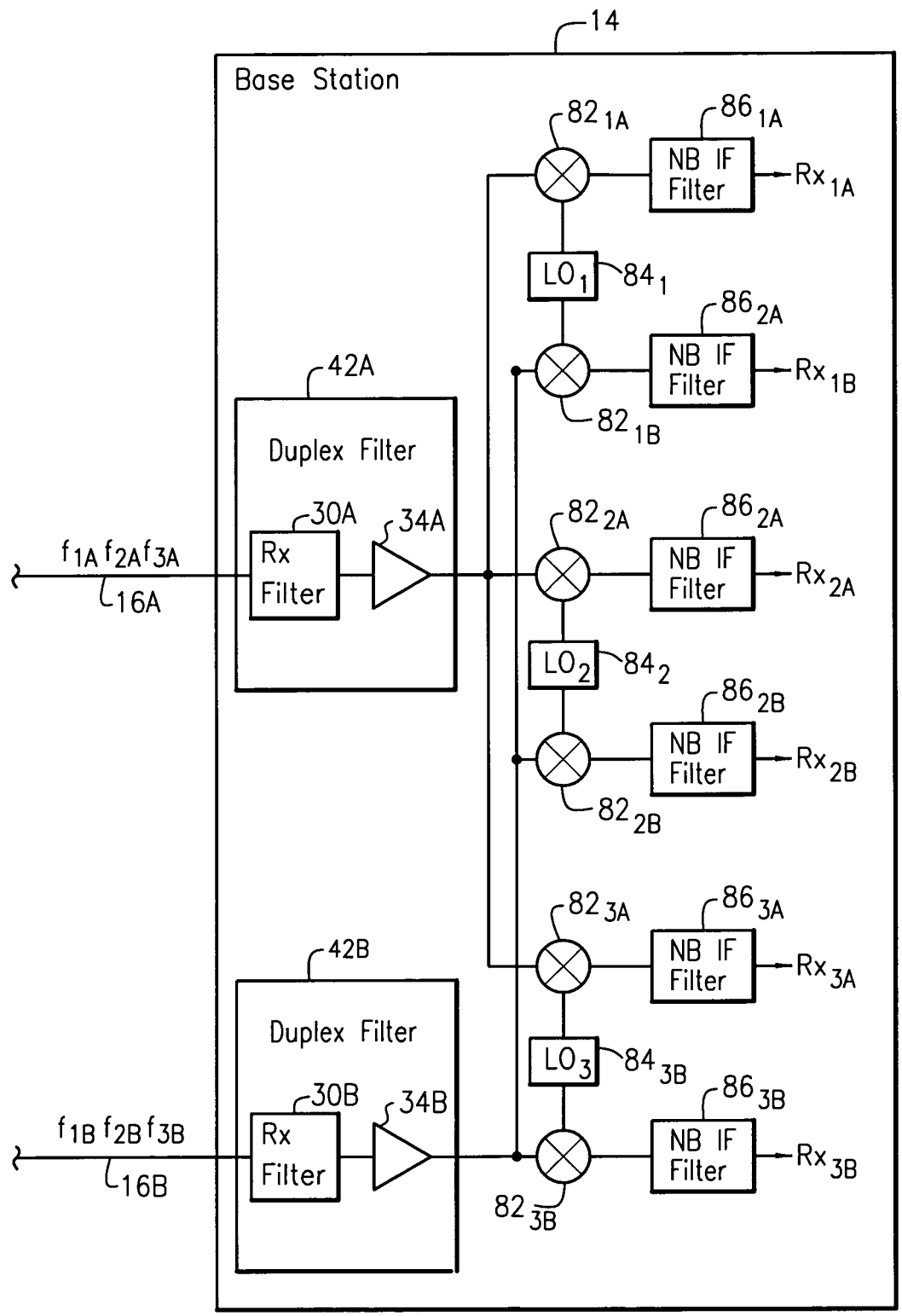

FIGS. 13A and 13B are a function block diagram of another non-limiting example embodiment of a multi-sector, omni-base station 94 with reduced combiner loss and with diversity. Each sector TMA $18_1$, $18_2$, and $18_3$ includes two diversity receive branches A and B, although more than two diversity branches may be used if desired. For simplicity, transmit paths have been omitted. Each TMA includes a receive (Rx) filter $72_{1A}$, $72_{2A}$, and $72_{3A}$ coupled to a respective first antenna $10_{1A}$, $10_{2A}$, and $10_{3A}$ as well as a receive (Rx) filter $72_{1B}$, $72_{2B}$, and $72_{3B}$ coupled to a respective second antenna $10_{1B}$, $10_{2B}$, and $10_{3B}$.

Each receive filter in the first diversity branch is coupled to a respective amplifier $74_{1A}$, $74_{2A}$, and $74_{3A}$, and each receive filter in the second diversity branch is coupled to a respective amplifier $74_{1B}$, $74_{2B}$, and $74_{3B}$. The amplified output for each of the first branches is coupled to a corresponding first mixer $76_{1A}$, $76_{2A}$, and $76_{3A}$, generated for example by a respective sector local oscillator $78_1$, $78_2$, and $78_3$. The amplified output for each of the second branches is coupled to a corresponding second mixer $76_{1B}$, $76_{2B}$, and $76_{3B}$, where it is mixed with a frequency translating signal generated for example by the same respective sector local oscillator $78_1$, $78_2$, and $78_3$. The frequency translating signal in this non-limiting example is different for each sector so that the two diversity signals for each sector are converted to a frequency that is different form the other sector signals. Each mixer's output in the first diversity branch is filtered using a respective narrowband (NB) or bandpass filter $80_{1A}$, $80_{2A}$, and $80_{3A}$ centered on the respective frequency to remove other mixer products as well as noise and interference in the available band. Similarly, each mixer's output in the second diversity branch is filtered using a respective narrowband (NB) or bandpass filter $80_{1B}$, $80_{2B}$, and $80_{3B}$ centered on the respective frequency to remove other mixer products. The two narrowband filters in each sector are centered on the same respective frequency.

The "A" diversity branch outputs from each sector are combined in a first combiner 62A, and the "B" diversity branch outputs from each sector are combined in a second combiner 62B. In this way, only one feeder 16A is needed to couple the TMA received signals from the first diversity branches at different frequencies $f_{1A}$, $f_{2A}$, and $f_{3A}$ to an omni-base station 14, and only one feeder 16B is needed to couple the TMA received signals from the second diversity branches at different frequencies $f_{1B}$, $f_{2B}$, and $f_{3B}$ to the omni-base station 14.

The omni-base station unit 14 includes a first duplex filter and low noise amplifier unit 42A for the first feeder 16A and a second duplex filter and low noise amplifier unit 42B for the first feeder 16B. The output from the first duplex filter and low noise amplifier unit 42A is connected to mixers $82_{1A}$, $82_{2A}$, and $82_{3A}$, and the output from the second duplex filter and low noise amplifier unit 42B is connected to mixers $82_{1B}$, $82_{2B}$, and $82_{3B}$. The output from the single local oscillator $LO_1$ $84_1$ is mixed with the inputs to mixers $82_{1A}$ and $82_{1B}$ to convert those signals to an IF or other desired frequency (e.g., baseband as in a homodyne) for respective filtering at $86_{1A}$ and $86_{1B}$ to produce diversity received signals $Rx_{1A}$ and $Rx_{1B}$ from sector 1. The output from the single local oscillator $LO_2$ $84_2$ is mixed with the inputs to mixers $82_{2A}$ and $82_{2B}$ to convert those signals to an IF or other desired frequency for respective filtering at $86_{2A}$ and $86_{2B}$ to produce diversity received signals $Rx_{2A}$ and $Rx_{2B}$ from sector 2. The output from the single local oscillator $LO_3$ $84_3$ is mixed with the inputs to mixers $82_{3A}$ and $82_{3B}$ to convert those signals to an IF or other desired frequency (e.g., baseband as in a homodyne) for respective filtering at $86_{3A}$ and $86_{3B}$ to produce diversity received signals $Rx_{3A}$ and $Rx_{3B}$ from sector 3.

Figure 14:
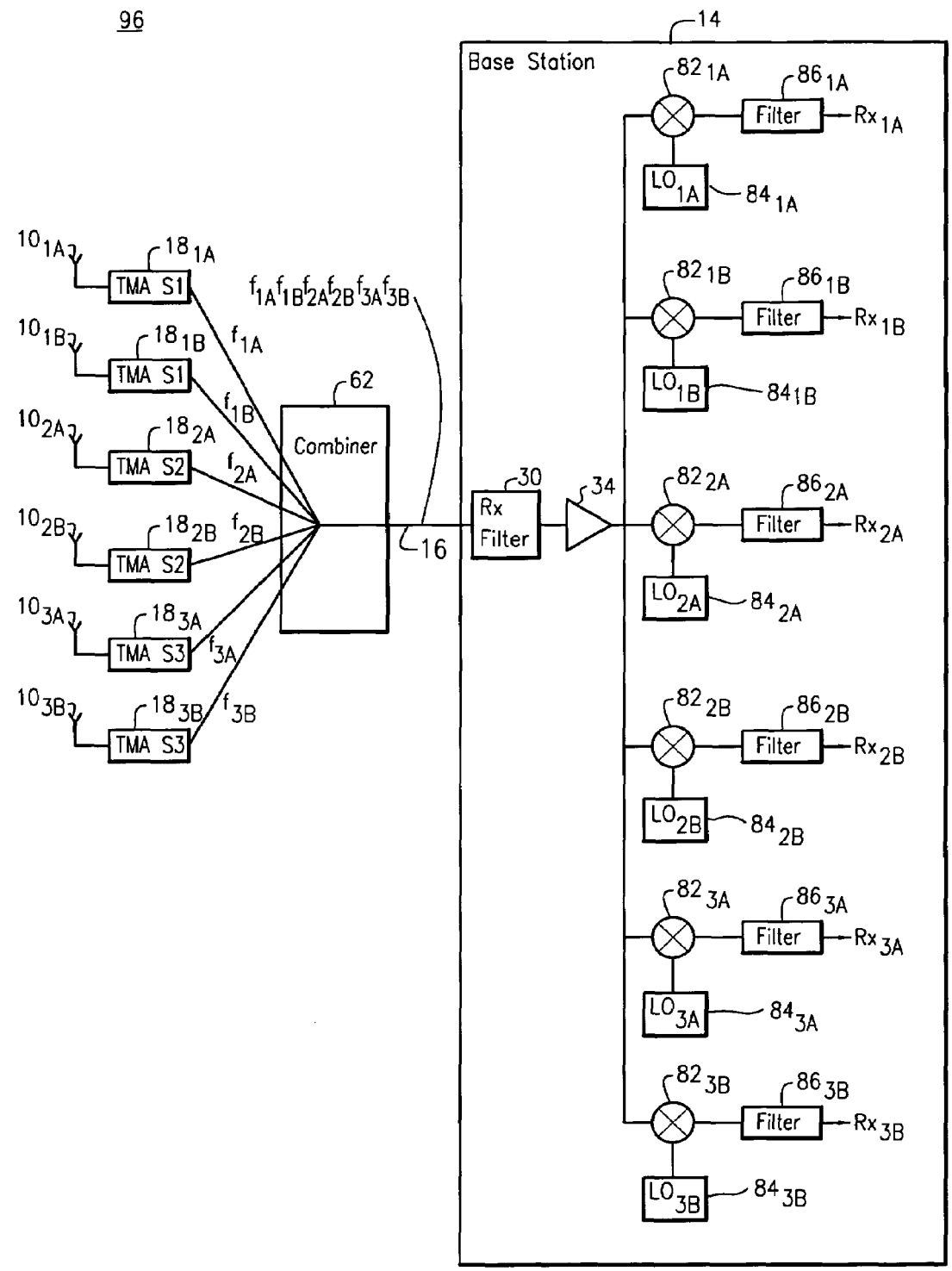
FIG. 14 is a function block diagram of yet another non-limiting example embodiment of a multi-sector, omni-base station with reduced combiner loss with diversity using just a single feeder.

FIG. 14 is a function block diagram of yet another non-limiting example embodiment of a multi-sector, omni-base station 96 with reduced combiner loss and with diversity using just a single feeder 16. In this non-limiting example, there are three sectors S1-S3, and each sector includes two diversity antennas $10_A$ and $10_B$. Each diversity antenna has its own TMA (a respective one of $18_{1A}$-$18_{3B}$) that generates in this example an output signal at a different frequency (a respective one $f_{1A}$-$f_{3B}$). Those six different frequency carriers $f_{1A}$-$f_{3B}$ are combined in a single combiner 62 and transported to the omni-base station unit 14 over a single feeder 16. Because each sector diversity signal is at a different frequency in this non-limiting example, they do not directly interfere in the combiner 62 or the feeder 16. As compared to the example embodiment in FIGS. 13A-13B, one less combiner and one less feeder are used, which saves on expense. A disadvantage though is that, depending on the size of the available frequency band allocated to the base station, there may be little or no guard band between each of the six TMA signals $f_{1A}$-$f_{3B}$. As a result, there may be added interference, and thus, reduced signal-to-noise ratio. In addition, only a single duplex receive filter 30 and LNA 34 are needed in the base station unit 14, as compared to two in the example embodiment in FIGS. 13A-13B. On the other hand, six (as compared to three) different local oscillators $84_{1A}$-$84_{3B}$ are needed to provide six different local oscillator signals $LO_{1A}$-$LO_{3B}$ to respective mixers $82_{1A}$-$82_{3B}$.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. An apparatus for use in a multi-sector omni-radio base station providing radio communications coverage for a geographic site area that is divided into a plurality of sectors, comprising:
   multiple sector antenna units, each sector antenna unit providing radio communications coverage for a particular sector that differs from the sectors covered by others of the multiple sector antenna units, and each of the multiple sector antenna units having an antenna for transmitting downlink transmissions and for receiving a carrier signal associated with a receive antenna frequency in an available frequency band;
   a frequency converter for frequency converting the carrier signal received by one of the multiple sector antenna units from the receive antenna frequency to a respective frequency different from the receive antenna frequency; and
   a splitter/combiner for:
      receiving a downlink signal with a total transmission power and splitting the downlink signal into a plurality of identical split signals to be transmitted by the multiple sector antenna units, each of the split signals having a respective portion of the total transmission power of the received downlink signal, where each of the sector antenna units transmits its respective split signal at a same base station transmit frequency with the respective portion of the total transmit power; and
      combining in the uplink direction carrier signals received from multiple different sectors by corresponding ones of the multiple sector antenna units to create a composite signal containing information received from multiple different sectors for communication to the multi-sector omni-radio base station,
   wherein at least two of the carrier signals associated with the multiple sector antenna units and combined in the combiner are at a different frequency.

2. The apparatus in claim 1, wherein the number of multiple sector antenna units having a corresponding frequency converter is less than the number of multiple sector antenna units.

3. The apparatus in claim 1, wherein the number of multiple sector antenna units having a corresponding frequency converter is the same as the number of multiple sector antenna units.

4. The apparatus in claim 1, wherein the splitter/combiner is configured to combine carrier signals associated with each of the multiple sector antenna units to create a composite signal in which all of the carrier signals combined are associated with a different frequency.

5. The apparatus in claim 1, wherein the splitter/combiner is configured to combine received carrier signals associated with each of the multiple sector antenna units to create a composite signal in which some of the carrier signals to be combined are at a different frequency.

6. The apparatus in claim 1, wherein the frequency converter includes:
   a first local oscillator (LO) for providing a first LO frequency signal;
   a first mixer for frequency converting the carrier signal using the first LO frequency signal to an intermediate frequency (IF) signal;
   a narrowband IF filter for filtering the IF signal;
   a second local oscillator for providing a second LO frequency signal corresponding to the respective frequency band;
   a second mixer for mixing the second LO frequency signal and the intermediate frequency signal to generate a frequency converted output; and
   a filter for filtering the frequency converted output to the respective frequency.

7. The apparatus in claim 1, wherein the frequency converter includes:
   a first local oscillator (LO) for providing a first LO frequency signal corresponding to the respective frequency;
   a first mixer for frequency converting the associated carrier signal using the first LO frequency signal; and
   a narrowband filter for filtering an output of the first mixer to the respective frequency.

8. The apparatus in claim 7, further comprising:
   a feeder coupled to the splitter/combiner for transporting the composite signal, and
   a base station unit coupled to the feeder for extracting each of the carrier signals corresponding to the multiple sector antenna units from the composite signal, the base station unit including one or more base station mixers, each base station mixer is configured to frequency convert a corresponding one of the respective carrier signals associated with a different frequency to an intermediate frequency or to baseband for further processing.

9. The apparatus in claim 8, wherein a first base station mixer is configured to receive a local oscillator signal to facilitate downconverting to intermediate frequency or baseband of one of the subbands of the feeder and a second base station mixer is configured to receive another local oscillator signal to facilitate downconverting to intermediate frequency or baseband of another of the subbands of the feeder.

10. The apparatus in claim 1, wherein one or more frequency converters are included in a corresponding one or more of the multiple sector antenna units.

11. The apparatus in claim 1, wherein one or more frequency converters each corresponding one of the multiple sector antenna units is included in the splitter/combiner.

12. The apparatus in claim 1, wherein if there are multiple respective different frequency bands, those respective different frequencies are distributed over the available frequency band.

13. The apparatus in claim 12, wherein those respective frequency bands are evenly distributed over the available frequency band.

14. The apparatus in claim 1, wherein each antenna unit is a tower mounted amplifier (TMA) unit including a receiver filter corresponding to the available bandwidth coupled to an amplifier for amplifying the received signal.

15. The apparatus in claim 1, wherein the frequency converter and the splitter/combiner are combined into a single unit or are separate units.

16. The apparatus in claim 1, further comprising:
   a feeder coupled to the splitter/combiner for transporting the composite signal, and
   a base station unit coupled to the feeder for extracting each of the carrier signals from the composite signal.

17. The apparatus in claim 16, wherein the base station unit includes a transceiver having one or more mixers each of which is configured to frequency convert a respective carrier signal to an intermediate frequency or to baseband for further processing.

18. The apparatus in claim 1, wherein each sector includes a first diversity antenna unit and a second diversity antenna unit.

19. The apparatus in claim 18, wherein the splitter/combiner includes:
   a first splitter/combiner for combining carrier signals associated with each of the first diversity antenna units to create a first composite signal for communication to the multi-sector omni-radio base station, and
   a second splitter/combiner for combining carrier signals associated with each of the second diversity antenna units to create a second composite signal for communication to the multi-sector omni-radio base station.

20. The apparatus in claim 19, further comprising:
   a first feeder coupled to the first splitter/combiner for transporting the first composite signal;
   a second feeder coupled to the second splitter/combiner for transporting the second composite signal; and
   a base station unit coupled to the first and second feeders for extracting each of the carrier signals corresponding to the multiple sector antenna units from the first and second composite signals, the base station unit including one or more base station mixers, each base station mixer is configured to frequency convert a corresponding one of the respective carrier signals associated with a different frequency to an intermediate frequency or baseband for further processing.

21. The apparatus in claim 18, wherein the splitter/combiner is configured to combine carrier signals associated with each of the first and second diversity antenna units to create the composite signal for communication to the multi-sector omni-radio base station.

22. The apparatus in claim 21, further comprising:
   a feeder coupled to the splitter/combiner for transporting the composite signal, and
   a base station unit coupled to the feeder for extracting each of the received carrier signals corresponding to the multiple sector antenna units from the composite signal, the base station unit including one or more base station mixers, each base station mixer is configured to frequency convert a corresponding one of the respective received carrier signals associated with a different frequency to an intermediate frequency or baseband for further processing.

23. The apparatus in claim 1, wherein one or more narrowband filters are included in the splitter/combiner.

24. A method for use in multi-sector omni-radio base station including multiple sector antenna units each having an antenna, the multi-sector omni-radio base station providing radio communications coverage for a geographic site area that is divided into a plurality of sectors, and comprising:
   each of the multiple sector antenna units providing radio communications coverage for a particular sector that differs from the sectors covered by others of the multiple sector antenna units by transmitting downlink transmissions and receiving a carrier signal associated with a receive antenna frequency in an available frequency band;

frequency converting the carrier signal received by one of the multiple sector antenna units from the receive antenna frequency to a respective frequency different from the receive antenna frequency;

combining in the uplink direction in a splitter/combiner carrier signals received from multiple different sectors by corresponding ones of the multiple sector antenna units to create a composite signal containing information received from multiple different sectors for communication to the multi-sector omni-radio base station;

receiving a downlink signal with a total transmission power at the splitter/combiner; and splitting in the splitter/combiner the downlink signal into a plurality of identical split signals to be transmitted by the multiple sector antenna units, each of the split signals having a respective portion of the total transmission power of the received downlink signal, where each of the sector antenna units transmits its respective split signal at a same base station transmit frequency with the respective portion of the total transmit power, wherein at least two of the carrier signals associated with the multiple sector antenna units and combined in the splitter/combiner are at a different frequency.

25. The method in claim 24, wherein the number of multiple sector antenna units for which a corresponding frequency conversion is performed is less than the number of multiple sector antenna units.

26. The method in claim 24, wherein the number of multiple sector antenna units for which a corresponding frequency conversion is performed is the same as the number of multiple sector antenna units.

27. The method in claim 24, wherein the combining includes combining carrier signals associated with each of the multiple sector antenna units to create a composite signal in which all of the carrier signals to be combined are at a different frequency.

28. The method in claim 24, wherein the combining includes combining carrier signals associated with each of the multiple sector antenna units to create a composite signal in which some of the carrier signals to be combined are at a different frequency.

29. The method in claim 24, wherein the frequency converting includes:
providing a first local oscillator (LO) frequency signal;
frequency converting the carrier signal using the first LO frequency signal to an intermediate frequency signal;
using a narrowband intermediate frequency to filter the intermediate frequency signal;
providing a second LO frequency signal corresponding to the respective frequency band;
mixing the second LO frequency signal and the filtered intermediate frequency signal and mixing them to generate a frequency converted output; and
bandpass filtering the frequency converted output to the respective frequency.

30. The method in claim 24, wherein the frequency converter includes:
providing a first local oscillator (LO) frequency signal corresponding to the respective frequency;
frequency converting the associated carrier signal using the first LO frequency signal to generate a frequency converted output; and
narrowband filtering the frequency converted output to the respective frequency.

31. The method in claim 30, further comprising:
transporting the composite signal over a feeder to a base station unit, and
extracting at the base station unit each of the carrier signals corresponding to the multiple sector antenna units from the composite signal including frequency converting at least one respective carrier signal associated with a different frequency to an intermediate frequency or baseband for further processing.

32. The method in claim 31, wherein at least two base station mixers in the base station unit each receives a different local oscillator signal.

33. The method in claim 24, wherein if there are multiple respective different frequencies, those respective different frequencies are distributed over the available frequency band.

34. The method in claim 33, wherein those respective frequencies are evenly distributed over the available frequency band.

35. The method in claim 24, further comprising:
transporting the composite signal over a feeder to a base station unit, and
extracting each of the carrier signals from the composite signal at the base station unit.

36. The method in claim 35, wherein each sector includes a first diversity antenna unit and a second diversity antenna unit.

37. The method in claim 36, wherein the combining includes:
combining in a first splitter/combiner carrier signals associated with each of the first diversity antenna units to create a first composite signal for communication to the multi-sector omni-radio base station, and
combining in a second splitter/combiner carrier signals associated with each of the second diversity antenna units to create a second composite signal for communication to the multi-sector omni-radio base station.

38. The method in claim 37, further comprising:
transporting the first composite signal over a first feeder;
transporting the second composite signal over a second feeder; and
extracting at the base station unit each of the carrier signals corresponding to the multiple sector antenna units from the first and second composite signals including frequency converting at least one respective carrier signal associated with a different frequency to an intermediate frequency or baseband for further processing.

39. The method in claim 36, wherein the combining includes combining carrier signals associated with each of the first and second diversity antenna units to create the composite signal for communication to the multi-sector omni-radio base station.

40. The method in claim 39, further comprising:
transporting the composite signal over a feeder, and
extracting at the base station unit each of the carrier signals corresponding to the multiple sector antenna units from the composite signal including frequency converting at least one respective carrier signal associated with a different frequency to an intermediate frequency or baseband for further processing.

* * * * *